US011528207B1

(12) United States Patent
Polyanskiy et al.

(10) Patent No.: US 11,528,207 B1
(45) Date of Patent: *Dec. 13, 2022

(54) COMPUTING SYSTEM MONITOR AUDITING

(71) Applicant: Amazon Technologies, Inc., Seattle, WA (US)

(72) Inventors: Ruslan Anatolyevich Polyanskiy, Bothell, WA (US); Sangkyun Yoon, Issaquah, WA (US); Colby Jordan, Seattle, WA (US); Volodymyr Nikitinskyy, Bothell, WA (US); Bernard L. Griesmer, Bellevue, WA (US); Sukhreet Kaur Buttar, Bothell, WA (US); Loren Stephen Hills, Marysville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/698,565

(22) Filed: Sep. 7, 2017

Related U.S. Application Data

(63) Continuation of application No. 14/574,249, filed on Dec. 17, 2014, now Pat. No. 9,800,489.

(51) Int. Cl.
H04L 43/12 (2022.01)

(52) U.S. Cl.
CPC .................... H04L 43/12 (2013.01)

(58) Field of Classification Search
None
See application file for complete search history.

(56) References Cited

U.S. PATENT DOCUMENTS

| 9,342,981 | B1* | 5/2016 | Nay | G06F 8/65 |
| 2008/0295095 | A1* | 11/2008 | Watanabe | G06F 11/0712 718/1 |
| 2009/0037824 | A1* | 2/2009 | Vedula | G06F 11/302 715/736 |
| 2010/0083046 | A1* | 4/2010 | Tanaka | G06F 11/0709 714/37 |
| 2010/0122119 | A1* | 5/2010 | Bildhauer | G06F 11/3409 714/47.1 |

(Continued)

OTHER PUBLICATIONS

Non-Final Office Action, U.S. Appl. No. 14/574,249, dated Dec. 19, 2016, 31 pages.

(Continued)

Primary Examiner — Younes Naji
(74) Attorney, Agent, or Firm — Nicholson De Vos Webster & Elliott LLP

(57) ABSTRACT

Technology for auditing monitors is provided. In one example, a method may include identifying a virtualized computing system to be audited. The method may further include identifying existing monitors on the virtualized computing system for monitoring the virtualized computing system and collecting metrics. The existing monitors may be compared against defined monitors specified in a data store for the virtualized computing system to identify missing monitors absent from the virtualized computing system. The virtualized computing system having the missing monitors may be flagged.

18 Claims, 8 Drawing Sheets

(56) References Cited

U.S. PATENT DOCUMENTS

| | | | | |
|---|---|---|---|---|
| 2010/0299713 | A1* | 11/2010 | Salinger | H04N 7/104 |
| | | | | 439/578 |
| 2012/0084780 | A1* | 4/2012 | Pasternak | H04L 43/02 |
| | | | | 718/100 |
| 2012/0271949 | A1* | 10/2012 | Radhakrishnan | G06F 9/5061 |
| | | | | 709/226 |
| 2013/0014096 | A1* | 1/2013 | Mayo | G06F 8/62 |
| | | | | 717/170 |
| 2013/0036218 | A1 | 2/2013 | Campagnoni | |
| 2013/0036359 | A1* | 2/2013 | Campagnoni | G06F 11/3093 |
| | | | | 715/736 |
| 2013/0166520 | A1* | 6/2013 | Vass | G06F 16/70 |
| | | | | 707/694 |
| 2015/0081857 | A1* | 3/2015 | Billore | H04L 41/046 |
| | | | | 709/221 |
| 2016/0021604 | A1* | 1/2016 | Weksler | H04W 48/18 |
| | | | | 370/328 |
| 2016/0087868 | A1* | 3/2016 | Polychronis | H04L 43/12 |
| | | | | 709/224 |

OTHER PUBLICATIONS

Notice of Allowance, U.S. Appl. No. 14/574,249, dated Aug. 18, 2017, 19 pages.

Notice of Allowance, U.S. Appl. No. 14/574,249, dated Jul. 7, 2017, 20 pages.

* cited by examiner

COMPUTING SYSTEM MONITOR AUDITING

This application is a continuation of U.S. patent application Ser. No. 14/574,249, filed Dec. 17, 2014, which is incorporated herein by reference.

BACKGROUND

Applications and computing services are often made available over the Internet or other computer networks. Content providers, application providers, and/or computing service providers often utilize remote computing services to provide access to electronic resources, such as web services. Electronic resources may include processing services, memory services, storage services, networking services and generally any computing services supported by a hardware system substrate that used in a computing environment. Often hardware and/or software used to support the desired services are dynamically scalable to meet the changing load for the services at any given time. Users, for example, may rent, lease, or otherwise pay for access to networked computing resources and computing services, and thus reduce the burden of providing local hardware and/or software for computing services, as compared with implementations without network accessible computing services.

To facilitate increased utilization of network accessible computing resources provided via a data center, virtualization technologies can allow a single physical computing machine to host one or more instances of virtual machines that appear and operate as independent machines to a connected computer user. With virtualization, the single physical computing device can create, maintain or shut down virtual machines in a dynamic manner. In turn, users can request computer resources from a data center and be provided with varying numbers of virtual machine resources on an "as needed" basis or at least on an "as requested" basis. As the scale and scope of data centers has increased, the task of provisioning, administering, and monitoring the physical and virtual computing resources of the data center has become increasingly complicated.

DETAILED DESCRIPTION

Technology for auditing of monitors, such as metrics monitors or event monitors, is provided. A monitor is a software agent that may be loaded by virtualized software to monitor functional and operational aspects of virtualized software. For example, a monitor may monitor processing load, numbers of transactions, network connections, etc. As used herein, a monitor may be referred a "metrics monitor" or an "event monitor". In one example, a method may include identifying a virtualized computing system to be audited. The method may further include identifying existing monitors on the virtualized computing system for monitoring the virtualized computing system and collecting metrics. The existing monitors may be compared against a defined monitor specification stored in a monitor's data store for the virtualized computing system to identify monitors missing or absent from the virtualized computing system. The monitor specification may, for example, include a list of monitor names or types that are desired to be monitored for a specific virtualized computing system. The virtualized computing system may be flagged as missing specified or desired monitors when the missing monitors are identified.

In another example, a method for auditing monitors may include identifying a virtualized computing system to be audited. The virtualized computing system may reside in a service provider environment. Existing monitors may be identified on the virtualized computing system that are monitoring the virtualized computing system and collecting metrics. A list of existing monitors may be compared against a list of defined monitors (e.g., monitor specification) as specified in a monitors data store for the virtualized computing system. Monitors missing from the virtualized computing system may be identified based on the comparison. The missing monitors may be loaded or installed onto the virtualized computing system to monitor the virtualized computing system. For example, if a virtualized computing system is audited and monitors A, B, and C are expected, the computing system may be identified as missing one or more monitors if monitors A and C are found but not monitor B. An administrator may be notified of missing monitor B, the system may be identified as missing a monitor, and/or the missing monitor may be installed onto the computing system.

Figure 1A:
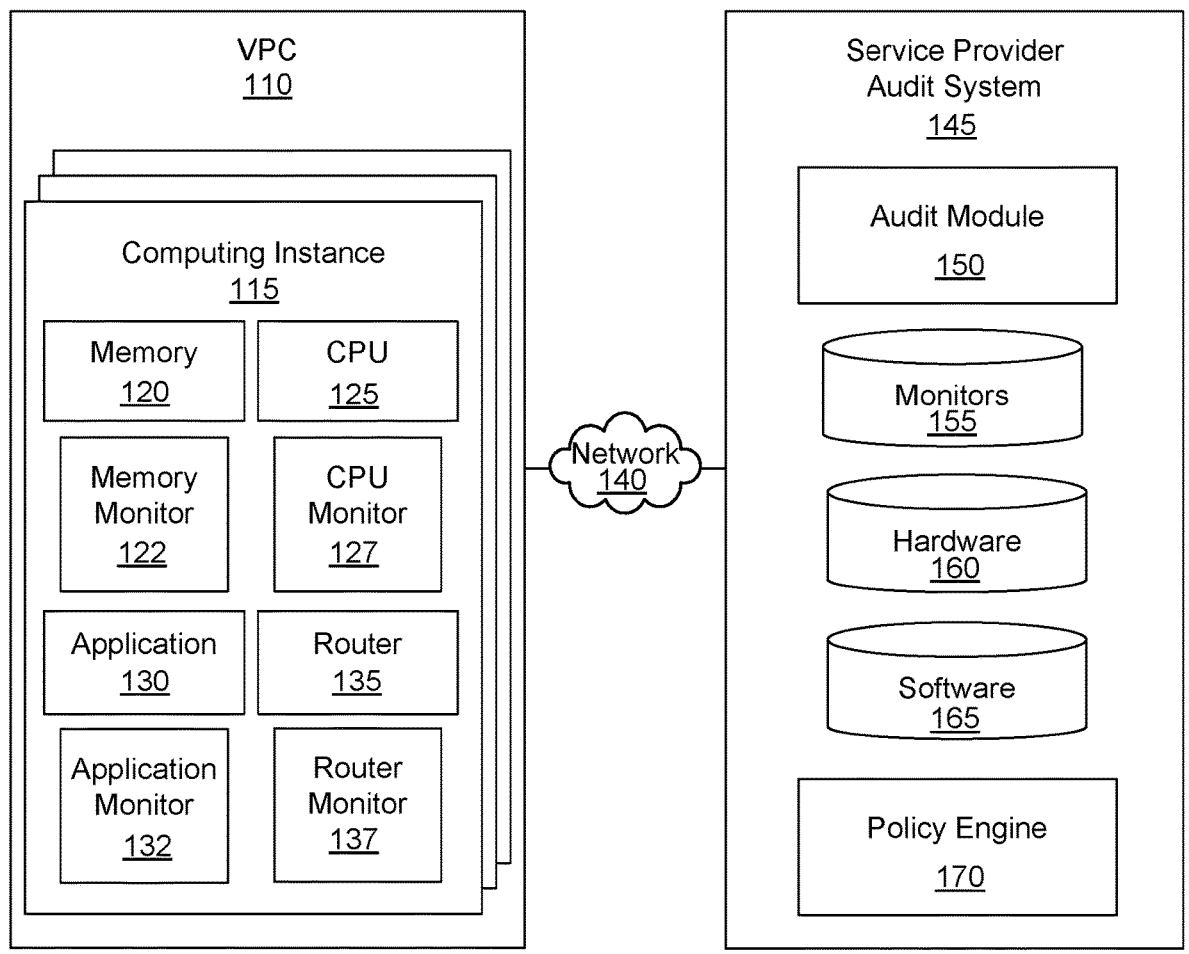
FIGS. 1A-1B are schematic overviews of audit systems for auditing monitors in a computing system in accordance with an example of the present technology.

FIG. 1A illustrates an example system for auditing monitors. The audit system may be in a service provider environment and may be a service provider audit system 145. The service provider audit system 145 may be used to audit computing systems in or outside of the service provider environment. The computing systems may be virtualized computing systems. For example, FIG. 1A illustrates a VPC (Virtual Private Cloud) 110 in a virtual computing system. The VPC 110 may include any number of computing instances 115 or other computing resources as will be described in additional detail later.

Various monitors may be present in the VPC 110. For example, a computing instance 115 may include a memory monitor 122 for monitoring memory 120 metrics, a CPU (Central Processing Unit) monitor 127 for monitoring CPU 125 metrics, an application monitor 132 for monitoring application 130 metrics, a router monitor 137 for monitoring router 135 metrics and so forth. Any variety or quantity of other types of monitors may be implemented in a given system and may vary from one system to another. The monitors may collect metrics for various aspects of a computing system for administrators or others to view performance, status, and other information about the computing system. For purposes of illustration, much of the discussion herein describes "metrics monitors", but it may be appreciated that any other type of monitor may also be considered, such as "event monitors" for example.

The service provider audit system 145 may communicate with the VPC 110 over a network 140, such as a virtual network, LAN (Local Area Network), the Internet, or any other suitable network. The service provider audit system 145 may be configured to analyze the VPC 110 to identify existing monitors on individual devices or individual virtualized devices collecting VPC metrics. The service provider audit system 145 may also identify software and hardware (physical and/or virtualized) in the VPC 110 or used by the VPC 110. The service provider audit system 145 may include an audit module 150 configured to perform the analysis to identify the monitors, hardware and/or software in the VPC 110. The audit module 150 may store the identification of the monitors, hardware and software in respective monitors, hardware and software data stores 155-165 with an identifier identifying the VPC 110 from which the monitors, hardware and software were identified. In an alternative example, the monitors available on a system may be tracked in a data store at the system being audited, where the table may further include identifiers of the hardware and/or software on the system. Monitor images (e.g., machine images of a monitor) for loading monitors missing from the system may be stored in a separate data store.

The service provider audit system 145 may be used to standardize the monitors located on specific types of devices or software platforms. The service provider audit system 145 may be used with other existing systems, such as metrics aggregation systems, policy engines and so forth. The audit module 150 may be configured to determine a base or core monitoring solution for a computing system. For example, the service provider audit system 145 may further include or integrate with a policy engine 170 for metrics monitoring. A policy engine 170 may be a software component that allows an organization to create, monitor and enforce rules about how network resources and the organization's data can be accessed.

The policy engine 170 may also define a base or core configuration or collection of monitors for a particular system. The base configuration may vary based on the hardware or software available on a device. The base configuration may be stored, for example, in the monitors' data store 155. The audit module 150 may analyze existing monitors and look for differences in the groupings or collections of monitors between what the base configuration is and what has been implemented (i.e., the existing monitors). Based on this analysis, the audit module 150 may identify missing monitors. If any discrepancies are found between the base configuration and the existing monitors (e.g., missing monitors are discovered), then the audit module may create a notification in a dashboard, an email or the like to notify an administrator of the discrepancy. The server provider audit system 145 enables administrators to view at a glance whether there are any gaps in the existing monitoring solution and whether there are additional metrics that would be desirable to collect and monitor.

Figure 1B:
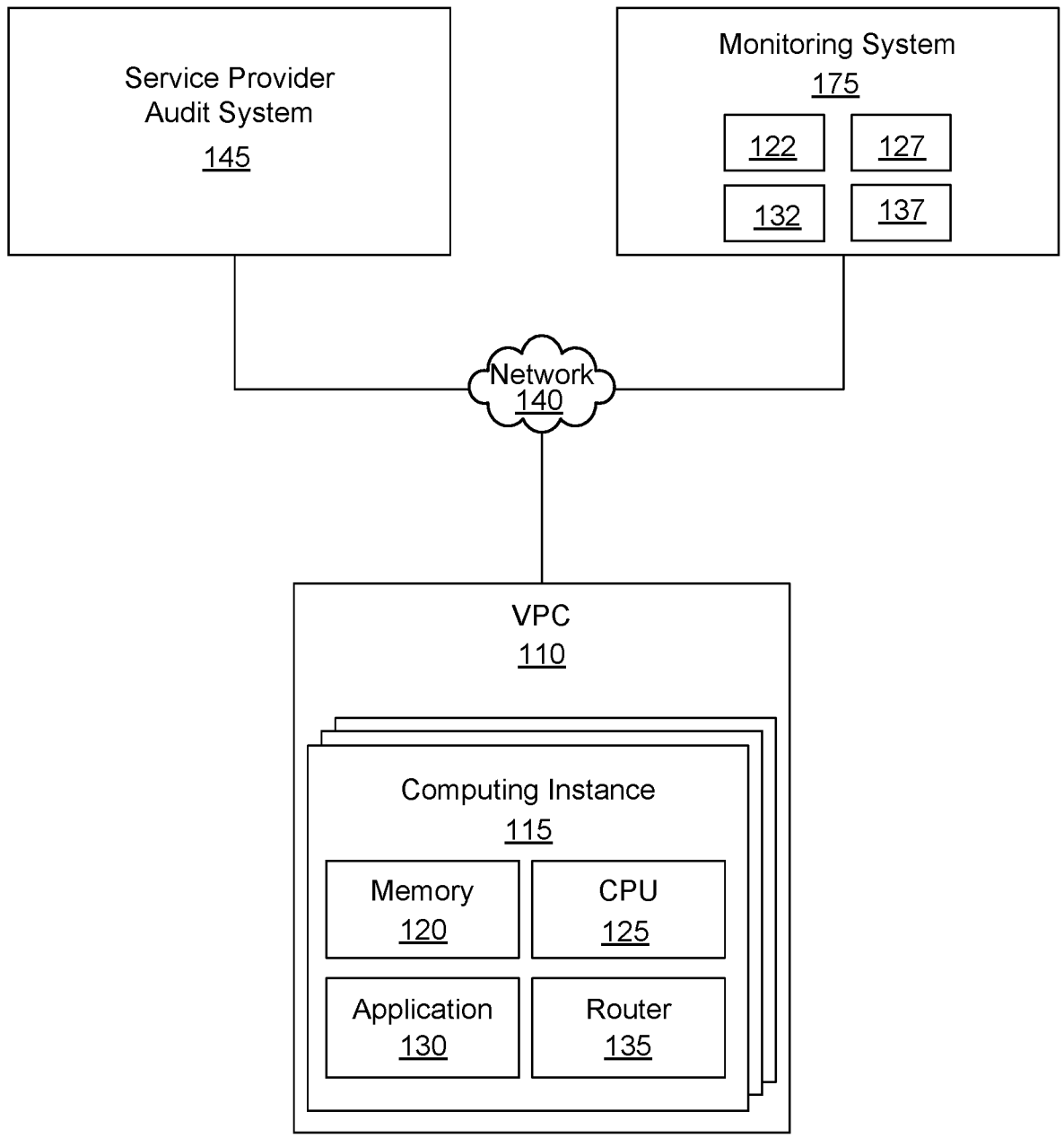

While FIG. 1A illustrates monitors 122, 127, 132, 137 at each computing instance 115 within the VPC 110, the monitors 122, 127, 132, 137 of FIG. 1A may alternatively be part of a monitoring system that may reside within the VPC 110, within the service provider environment (e.g., the environment from which the service provider audit system 145 is provided) or elsewhere. For example, FIG. 1B illustrates a monitoring system 175 which may monitor the VPC 110 over a network 140 connection. The service provider audit system 145 may access the VPC 110 and/or the monitoring system 175 to identify the system components (e.g., hardware and software components—memory 120, CPU 125, applications 130, router 135) of the VPC 110 and the monitors 122, 127, 132, 137 used by the monitoring system 175 to monitor the VPC 110 or more specifically to monitor the system components within the VPC 110. Some classes of monitors, such as monitors for routers, may be defined at endpoints in the system. However, many monitors or monitor classes are defined by standalone monitoring systems. Such systems are exemplified by FIG. 1B.

As will be described later, the service provider audit system 145 may crawl virtual computing systems and/or monitoring systems to identify system components and/or monitors. In at least some examples, a monitoring system 175 may already define the monitors present for monitoring the system and the service provider audit system 145 may simply retrieve the defined monitors without crawling or taking other measures to discover the monitors.

Figure 2:
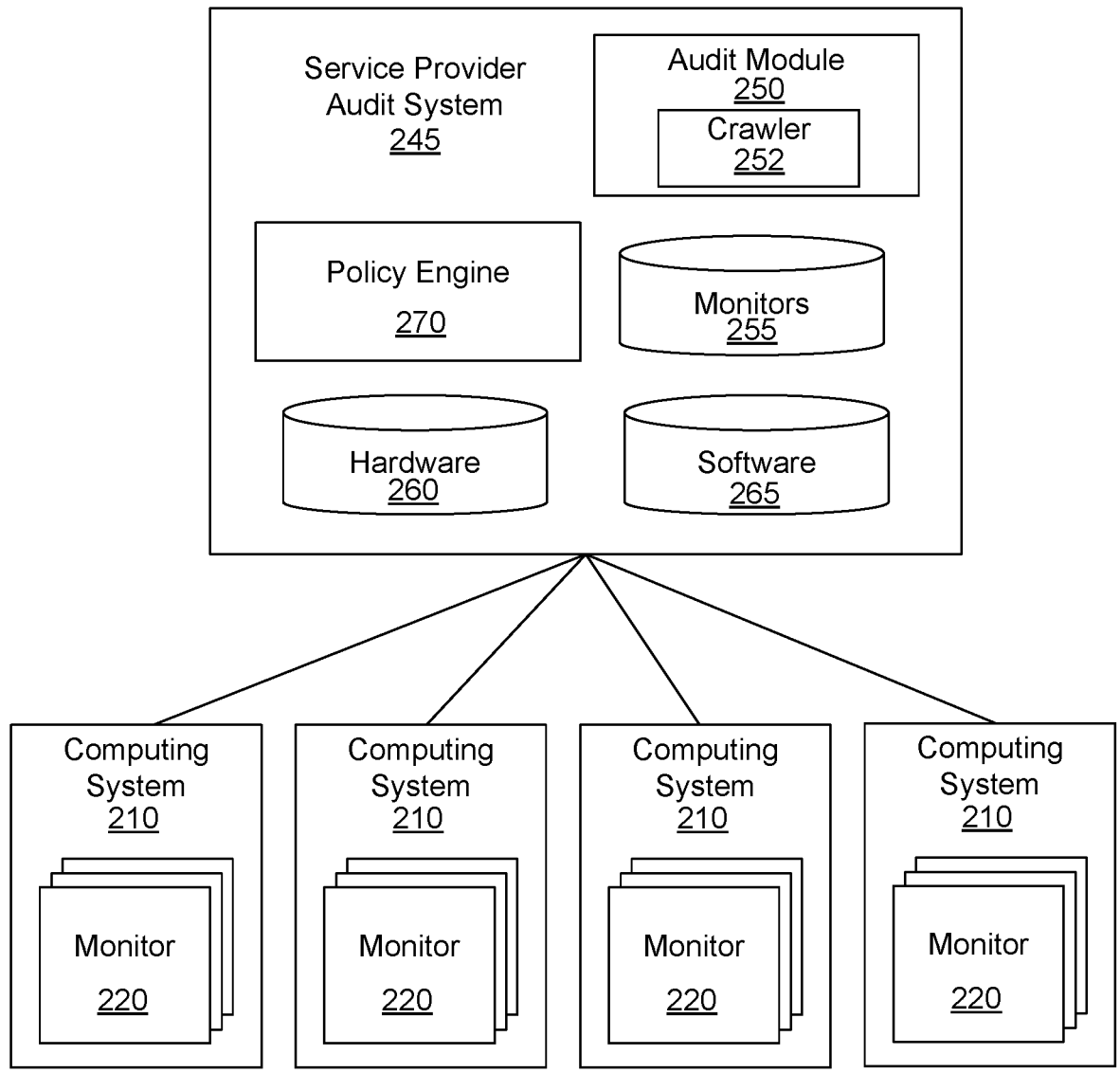
FIG. 2 is a schematic overview of an audit system for auditing monitors across multiple computing systems in accordance with an example of the present technology.

Reference will now be made to FIG. 2. FIG. 2 illustrates a system similar in some regards to that of FIGS. 1A-1B for auditing computing system monitors. Similarly as has been described, a service provider audit system 245 may include an audit module 250, a policy engine 270, and data stores 255-265 for monitors, hardware and/or software.

Not all production computing systems may support every available class of monitors. For example, a given computing system may not support the use of an availability monitor. The monitors' data store 255 may store data relating to the monitors being used on a computing system being audited. The audit module 250 may discover the monitors for a computing system and store the profile of the monitors together in the monitors data store 255 for any number of systems. This facilitates the management of identifying which systems have which monitors and which systems or system types support which classes of monitors. The monitors data store 255 may store metadata tying monitor names to monitor classes. The metadata for monitors may include, for example, a class of the monitor, keywords associated with the monitor, thresholds used by the monitor for trigger alarms, and so forth.

When the audit module 250 discovers monitors on a computing system, the audit module 250 may examine the existing monitors against the base configuration defined by the policy engine 270 based on monitor names and/or monitor classes. For example, the policy engine 270 may simply define monitor classes for a system and the audit module 250 may discover monitor names. The audit module 250 may then identify monitor classes for the identified monitor names and compare the identified monitor classes to the classes defined by the policy engine 270 in order to determine whether the computing system being audited meets the base configuration.

Any of a number of monitor classes may be defined. Also, monitor classes may fit into defined categories. For example, monitors may fall into at least two categories including availability and performance. Classes of monitors may be defined for specific hardware or software configurations. For example, classes of monitors may relate to hardware capacity, queue sizes, software capacity, latency, thread pool sizes, event detection, log scanning, storage sizes and so forth.

The service provider audit system 245 may be configured to identify improved efficiencies for monitors in a computing system. Some systems may use monitors inefficiently. For example, some systems may include many performance monitors where a single performance monitor may suffice. Some systems may send alerts or notifications, for example, if latency deviates from a standard or exceeds a threshold. Such a scenario could be monitored by using an availability monitor. A performance monitor may be used when a timeout for latency is exceeded. Availability monitors often monitor errors, failures and other events. For example, an availability monitor may generically catch errors and fails related to processing, completion, failure, not starting, not finishing in time, and so forth. In one example, a latency monitor could be replaced with a hardware queue monitors or the like. Such a replacement may provide more advance notice to an administrator regarding anomalous metrics while also reducing a performance hit that may occur from the use of a latency monitor. In other words, the service provider audit system 245 may be able to improve the use of available monitors or to improve the current configuration or mix of monitors.

The service provider environment audit system 245 may recommend removal of superfluous or redundant monitors, may recommend replacement of a monitor with a different monitor (which may be of a different type, class or category) or recommend the addition of one or more monitors to fill a gap in the existing monitoring solution. The policy engine 270 may define specific metrics or metric types to be collected for specific hardware or software. The monitor classes defined by the policy engine may include a definition of the metric types collected by the classes of monitors. As has and will be described, the audit module 250 may audit a system by comparing existing monitor types to monitor types or classes that are expected to be resident on a system. If a type or class of monitor is unknown but the metric type is identifiable, then the appropriate monitor type or class may be identifiable. The policy engine 270 may identify suitable monitor classes for various hardware configurations defined in the hardware data store 260 and suitable monitor classes for various software applications and configurations in the software data store 265.

When the audit module 250 discovers monitors 220 on the computing systems 210, the audit module 250 may compare discovered hardware to hardware in the hardware data store to identify monitor classes for the discovered hardware. The audit module 250 may compare discovered software to software in the software data store 265 to identify monitor classes for the discovered software. The audit module 250 may perform a lookup of these classes in the monitors data store 255 to identify (such as by identifying monitors by name) which monitors match the classes. The monitor names in the monitors' data store 255 may be compared against monitor names discovered for the computing system to determine whether the existing monitors match the classes specified in the hardware and software data stores 260, 265. Further, the audit module 250 may determine whether a plurality of discovered monitors 220 match a same class. When multiple monitors match a same class, the monitors may be deemed redundant and a notification may be provided to an administrator notifying the administrator of the redundancy. (As will be described in further detail later, the audit module may actually add or remove monitors from computing systems to improve efficiency, collect additional metrics and so forth). When monitors of a particular class are discovered, such as performance monitors, the audit module may identify potential replacement monitors from a different category, such as availability monitors, in order to reduce system resource usage for monitoring. When the audit module discovers a monitor operating more often than is desirable, such as a performance monitor operating continuously, the audit module may notify an administrator that reducing performance monitor time to times when certain events have occurred, such as when latency is high, will reduce system resource usage for monitoring. Likewise, if a monitor is being underutilized and not capturing potentially important metrics, the audit module may notify an administrator of the potentially missed metrics, including a recommendation to increase usage of the monitor.

Monitors 220 on the computing systems 210 may monitor virtual host performance, availability metrics, CPU, memory, disk space or any of a variety of other metrics. Many monitors 220 that may be used in computing systems 210 may be application level monitors for monitoring application availability and application performance. The audit module 250 may utilize the monitors and software data stores to find monitors that are supported by each application. For example, errors may be monitored and an action may be to generate a notification based on the severity of the error. Some devices, networking devices, routers, or the like may not have a monitoring agent from which metrics are collected directly. However, these networking devices may also be monitored by monitoring inputs, outputs and the like. Such devices may be discovered, for example, using an SNMP (Simple Network Management Protocol) walking function or by providing MIBs (Management Information Bases, where a manufacturer defined ID is present on the device) for network devices. For example, an SNMP walk may walk an OD (object identifier) tree based on a starting OD to discover available devices. Some devices may not support agents locally, but the present technology may be modular to enable auditing and implementation of monitoring through the use of a virtualization service that supports SNMP.

In practice, the present technology may be used for monitoring computing instances, jobs, applications, internal tools for production, event lists, queues, and so forth. The present technology may be used to develop monitoring classes for production systems which may be useful in analyzing which monitors other computing systems are using that meets base configurations defined by the policy engine. Not only is the present technology capable of identifying missing monitors, but the technology may also provide recommendations to add monitors to a computing system to replace existing monitors or to supplement existing monitors as a result of missing monitors based on the classes or prescribed listing. The present technology may use data gathered by a computing system crawler 252 to suggest monitors not in use or installed. However, the number of installed monitors may be based on defined limits of what is possible for a given system to avoid over-taxing the computing system with monitoring. Whereas in conventional systems an administrator may be left to guess which monitors to use without much data to back up such a decision, the present technology may use data from other existing computing systems as a comparative tool to implement monitors on a system based on which monitoring solutions have worked well and efficiently for other systems.

The audit module 250 may test existing monitors for false positive results (e.g., test whether monitors report anomalous metrics), non-use flat detection (e.g., test whether the monitor is being used or returns useful results), and so forth. The audit module may also generate historical trends for monitor usage, metrics generated by the monitor over time and so forth, and these "meta" metrics may be used to modify how the monitor is used or to replace at least a part of an existing monitoring solution to improve the overall monitoring solution.

Machine learning may be an effective tool for use in optimizing selection of monitors for recommendations for use in computing systems. Machine learning may take empirical data as input, such as performance of monitoring solutions on other computing systems, and yield patterns or predictions which may be representative of the underlying mechanism, user thought or interaction process that resulted in the generation of the data. In other words, the machine learning may be used to identify a likely viable monitoring solution for a computing system being audited based on other computing system monitoring solutions. Machine learning systems may take advantage of data to capture characteristics of interest having an unknown underlying probability distribution. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to make modifications to monitor selection on a basis of the signals/inputs described previously or on any other suitable basis in order to test whether an accuracy of the recommendations is improved through the modification.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure.

The present technology may leverage existing systems to improve the quality of recommendations, analysis of computing systems 210 and so forth. Existing systems may not have an automated technology to indicate which monitors or alarms ought to be present based on devices present in the system. However, the present technology may categorize devices (e.g., hardware) or applications (e.g., software) by type in order to determine which monitor classes or types ought to be used for the computing system. For example, the policy engine 270 may specify that a network device ought to use monitor types A, D and E, that a host device ought to use monitor types A, B and C, and that a network flow device (such as a router) ought to use monitors B and D. Thus, different classes of monitors may be identified and/or recommended for a computing system based on the devices in the system.

The audit module 250 may include a crawler 252, as described previously, which may crawl a computing environment (e.g., a virtual private cloud) to identify hardware, software, and/or monitors. Various Application Programming Interfaces (APIs) may be available for use in searching, crawling or the like to identify the hardware, virtualized hardware, software, and/or monitors. For example, using a search API, the audit module may search for different individual monitors or combinations of monitors that are commonly used in order to discover the presence of commonly used monitors on the system. The audit module may use any suitable combination of search patterns together to search the system being audited for monitors, and the search patterns may represent a broadened scope of the search or the search patterns may exclude certain monitors from the results. The audit module may perform a device scan on a particular network. For example, if during a device scan, the audit module discovers an internet server at a particular address, the audit module may recommend a specific combination of monitors based on the presence of the internet server.

The audit module 250 may use an API (Application Programming Interface), SDK (Software Development Kit) or the like to access the computing system 210 being audited. The audit module 250 may crawl and query computing systems based on IP (Internet Protocol) ranges or ports to discover monitors 220, hardware, etc. The service provider audit system 245 may be modular such that a variety of modules may be available for instructing the audit module to crawl a network or IP range, to query a specific data store, to use a third-party API to access the computing system or monitors, and so forth. In one example, the audit module 250 may use APIs to set up or define monitoring classes for the system, to discover monitors 220, to discover which applications are present in the computing system and so forth. A user interface may be provided around the APIs for an administrator to use in interfacing with the computing system via the audit module 250.

Monitor classes may be predefined. Different classes of monitors may be defined for the availability and performance categories. Rather than auditing a computing system 210 based on specifically defined or named monitors, the computing system 210 may be audited based on the presence or absence of classes of monitors. While the audit module may crawl or search for monitors, some computing systems may include smart monitors capable of proactively reporting the monitor to the audit module. For example, a smart monitor may be configured to identify itself by name and/or as belonging to a particular monitor class. The smart monitor may report back to the audit module 250 that the monitor is present, available, operational, a monitor of a certain type, or may provide any other suitable useful information in response to a query.

As used herein "virtual computing" may refer to the use of computing services (hardware and/or software) which may be available at a remote location from the users of the computing services and the virtual computing services may be accessible over a network, such as the Internet. Users may be able to buy these computing services (including storage, computing power, networking and applications) as a utility on demand and sometimes by the hour. Use of virtual computing services can provide a number of advantages including cost advantages and/or the ability to adapt rapidly to changing computing service needs.

The service provider environment in which the audit system is implemented may be a multi-tenant service provider environment, such as a "cloud" environment for example. The service provider environment may include an execution environment or a computing instance that includes an application software stack for the user's program or application together with one or more infrastructure services for executing the user's program on a compute service. The virtualization environment or computing instance may include a user-selectable operating system (e.g., Linux, Windows, etc.), application server (e.g., Apache Tomcat), system or application configuration, etc. The virtualization environment can be configured to be accessed at a specific URL. The infrastructure services can include, but are not limited to, a load balancer to distribute workload across the requested computing services, a load scaler to scale computing services in response to load or demand variations, a firewall or other service to control access to the computing services, a monitoring interface that permits the user to monitor execution of applications, data storage resources (e.g., scalable volume block storage), and so forth. In some embodiments, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the computing service provider.

The service provider environment may be capable of delivery of computing and storage capacity, as well as other computing services, as a service to a community of end recipients. In an example implementation, the service provider environment may be established for an organization (i.e., a "customer") by or on behalf of the organization. That is, the service provider may offer a "virtual private cloud environment."

In one example, a service provider environment may include any number of server computers for a compute service. The server computers may provide computing services for executing software or computing instances, which may also be referred to as virtual machines. A virtual machine may generally be an instance of a software implementation of a machine (i.e. a computer) that executes computer code like a physical machine.

An application may be software or a computer program, such as may be designed to help a person perform an activity. An application may manipulate text, numbers, graphics, etc. Some application packages offer focused computing functions by focusing on a single task, such as numerical analysis. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. Applications executable on the local device and/or in the service provider environment may be any suitable type or form or application as may be appreciated.

The computing systems may include monitoring agents for measuring and/or collecting metrics related to the local device, such as related to the performance of the local device. The monitoring agent may be integrated into an application on the local device. The monitoring agent may be a software agent, a daemon, instrumentation or other technology for collecting metrics. In a specific example, the monitoring agent may specifically measure and/or collect metrics related to performance of the device during execution of a specific, identified application.

Metrics data may be collected for the various computing services that have been allocated for a user. Metrics data of the computing services may be analyzed, have trends tracked, be reported, etc. to monitor the usage patterns and functioning of the computer resources. Metrics data may be collected by a metrics collector or a monitoring agent as the monitor is being audited, for example. Operational performance, resource utilization, demand patterns, etc. of the computer resources may be measured. In some implementations, the metrics data may be tagged as requested by a requesting user or application. The requesting user or application may request that the service provider environment add key/value pairs to the metrics data so that the tagged metrics data may later be processed. The tagged metrics data may be output to a user or application.

As used herein, the term "measurement" may indicate an observed value with a set of attributes. For example, a measurement may include a name, a set of dimensions, a namespace, a unit, and/or a timestamp among possibly other additional (or fewer) characteristics. As used herein, the term "dimension" may be used to specify how a measurement can be aggregated, such as by InstanceID, Instance-Type, Availability Zone, or other factors (described in detail below). As used herein, a namespace may identify the service that collected the measurement. Furthermore, as used herein, a metric may include an aggregation of measurements data.

A user may specify one or more metrics that define how the various measurements are to be aggregated. For instance, metrics data may include the same attributes as the measurements data and may be the aggregate of some or all measurements with a given name, within a given period of time. As another example, a metric may include an aggregation of some or all of the measurements in a particular namespace, or another metric can include an aggregation of some or all measurements having a particular InstanceID, etc. A metric may, in some embodiments, be an aggregation of other metrics. As a result of this flexibility, in certain embodiments, metrics may include a variety of dimensions based on the preferences of the user.

The monitors described may be provided as part of a monitoring service from the service provider environment or may be separate from the service provider environment. A monitoring service may receive the metrics collected by the monitors (e.g., monitoring agents). Developers and system administrators may use the monitoring service to collect and track metrics, gain insight, and react promptly to keep applications and businesses running smoothly. Monitors selected and/or recommended by the audit module for a computing system may be selected to provide a reliable, scalable, and flexible monitoring solution that may be readily implemented and used. Recommendations and additions, removals or replacements of monitors may be performed based the audit systems recommendations. The monitors may be configured to enable users to programmatically retrieve monitoring data, view graphs, and set alarms to assist in troubleshooting, spotting trends, and taking automated action based on the state of applications or services as events occur. For example, the monitors may be used to monitor: computing instances, storage volumes, elastic load balancers, relational database service instances and so forth. Metrics such as CPU utilization, latency, and request counts may be collected. Administrators may further define custom application and system metrics to be collected, such as memory usage, transaction volumes, or error rates, which may be monitored in the monitoring service.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware, hardware processors and with other types of computing resources.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, key-value data stores, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The systems of FIGS. 1-2 may be implemented across one or more computing devices, which may be connected via a network. For example, the computing systems, computing devices or computing resources may host various engines and/or modules and such modules may be executable by a processor of the local device. The computing systems may be implemented as a plurality of computing nodes, each of which comprises at least one processor and a memory, where the computing nodes are configured to collectively implement the modules, data stores and so forth.

A computing system may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services provided through the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 3:
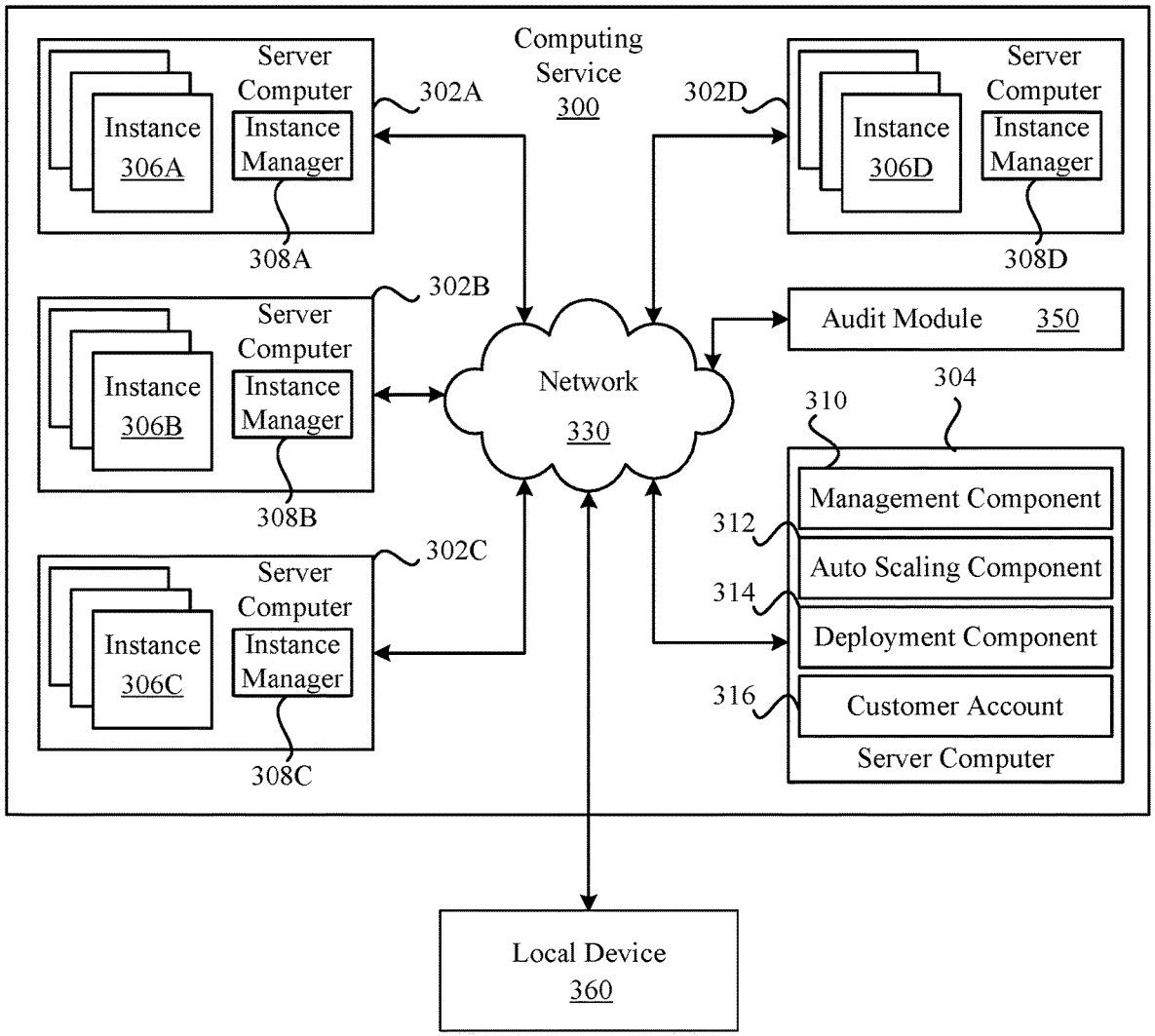
FIG. 3 is a schematic overview of a virtual computing resource provider in accordance with an example of the present technology.

FIG. 3 illustrates how components of a data center may function as a computing service 300 in a service provider environment and use this technology for auditing monitors. As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of sub-components executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

An audit module 350 may be utilized to: implement application and device monitoring standards (e.g., a base configuration of monitors for a system), implement an audit system that provides a monitoring audit against such standard, find gaps in existing monitors and recommend missing monitors based on the deviation of the standard. Furthermore, the audit module may be configured for integration with monitoring systems to automatically implement missing monitors with minimal human input and so forth as has been and will be described.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
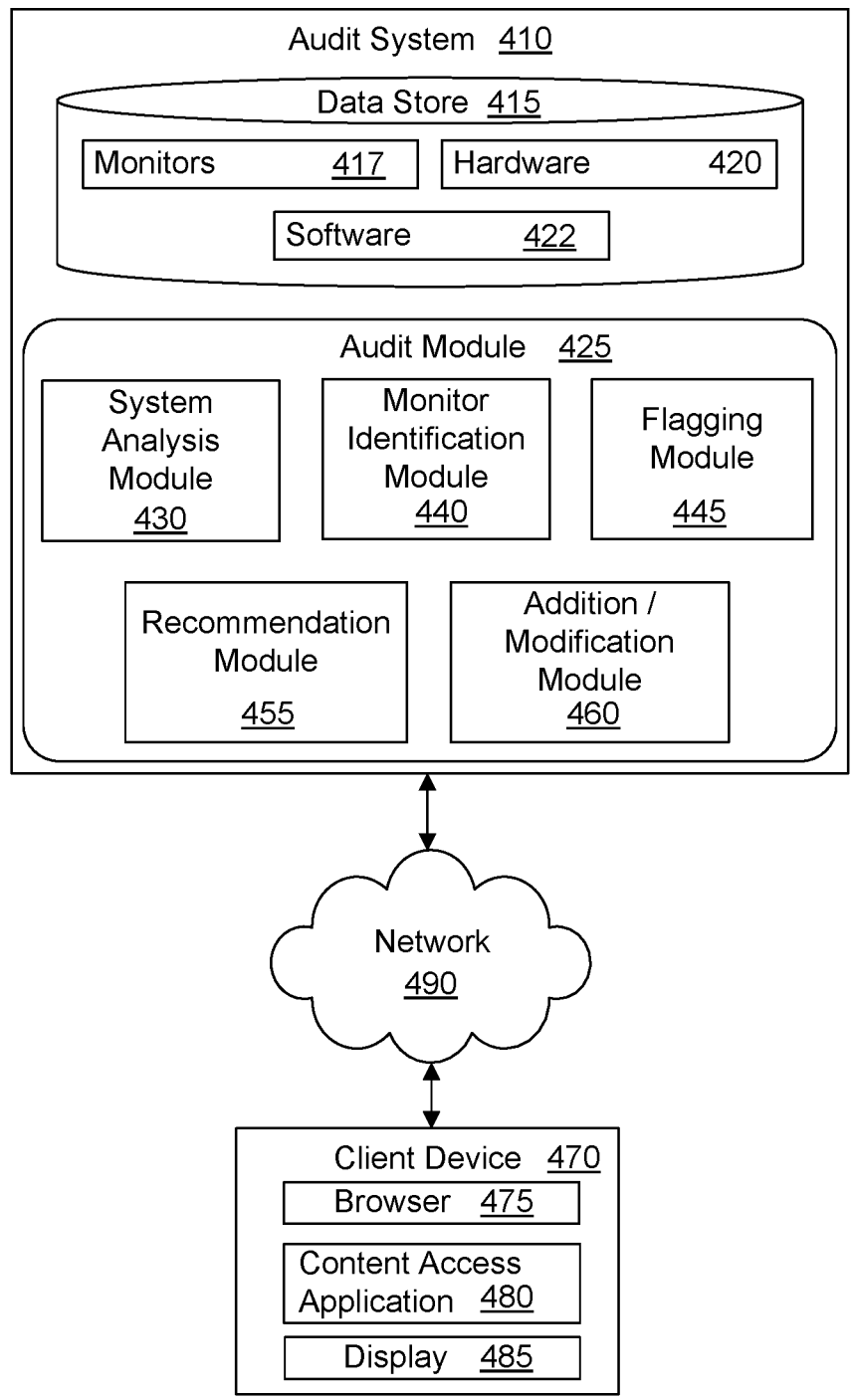
FIG. 4 is a block diagram of a system for auditing computing system monitors in accordance with an example of the present technology.

Referring now to FIG. 4, a block diagram of an audit system 410 for auditing monitors of computing systems is illustrated in accordance with an example of the present technology. The audit system 410 may be implemented and accessed using one or more computing devices in a service provider environment, such as a server as an example computing device, as well as client devices 470, and may be implemented across a network 490. The audit system 410 may include a data store 415 and a number of modules 430, 440, 445, 455, 460 for storing and processing data to be used in auditing.

The user may access and manage the one or more servers over a network connection, such as a connection through the Internet, for example. The user may perform various operations on the servers such as adding, updating, modifying, deleting or otherwise maintaining monitors, software or services on audited computing systems. These operations may be performed by the user from the client device 470.

The server(s) may be a computing instance as previously explained, and the computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisor) may provide a platform on which computing instances may be created. In other words, the computing instances may execute on the hardware layer by using the platform provided by the virtualization layer. This computing service architecture that supports computing instances is illustrated in more detail in FIG. 3.

The audit system 410 may include an audit module 425 having various components to perform operations as have been described previously. Specifically, the audit module 425 may include a system analysis module 430. The system analysis module 430 may be configured to analyze a computing system to identify system hardware and system applications. The system analysis module 430 may be further configured to compare the system hardware and system applications against the existing monitors based on data in the monitors data store.

The audit module 425 may further include a monitor identification module 440. The monitor identification module may be configured to identify existing monitors on a computing system. The monitors may be in place for monitoring the system hardware and system applications.

Specifically, the audit module 425 may also include a recommendation module 455 to provide recommendations of monitors for the computing system based on the results of the analysis performed by the system analysis module 430 and further based on a comparison to a base configuration defined in a policy engine, which results may be based on the existing monitors, hardware, and/or software. An addition/modification module 460 may be available to add to, remove, replace repair, or otherwise modify existing monitors, such as by adding the missing monitors to the computing system, for example.

The audit module may further include a flagging module 445. The flagging module may be configured to flag the computing system as missing monitors when the existing monitors differ from the defined monitors. When a flagged computing system is identified, notification may be provided to an administrator and/or remedial action may be automatically applied, such as the addition, removal, repair, or replacement of monitors on the computing system being audited.

The system may include one or more data stores 415. The data store 415 may include or be configured to store any of a variety of useful types and formats of data. For example, the data store 415 may include a monitors data store 417, a hardware data store 420, and a software data store 422 configured to respectively store monitors and identifications of monitors on audited systems, hardware data and software data, etc. as has been described.

Client devices 470 may access data, content pages, services of the audit system 410 and so forth via a computing instance or server in a computing service provider environment or one or more computing instances or clusters, over a network 490. Example client devices 470 may include, but are not limited to, a desktop computer, a laptop, a tablet, a mobile device, a television, a cell phone, a smart phone, a hand held messaging device, a personal data assistant, an electronic book reader, heads up display (HUD), or any device with a display 485 that may receive and present the message content.

The system may be implemented across one or more computing device(s) connected via a network 490. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may be a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content, such as auditing information, served up by the computing device and/or other servers. The content access application 480 may be executed to obtain and render for display auditing information from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. The client device may be configured to execute applications beyond those mentioned above, such as, for example, mobile applications, email applications, instant message applications and/or other applications. Users at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
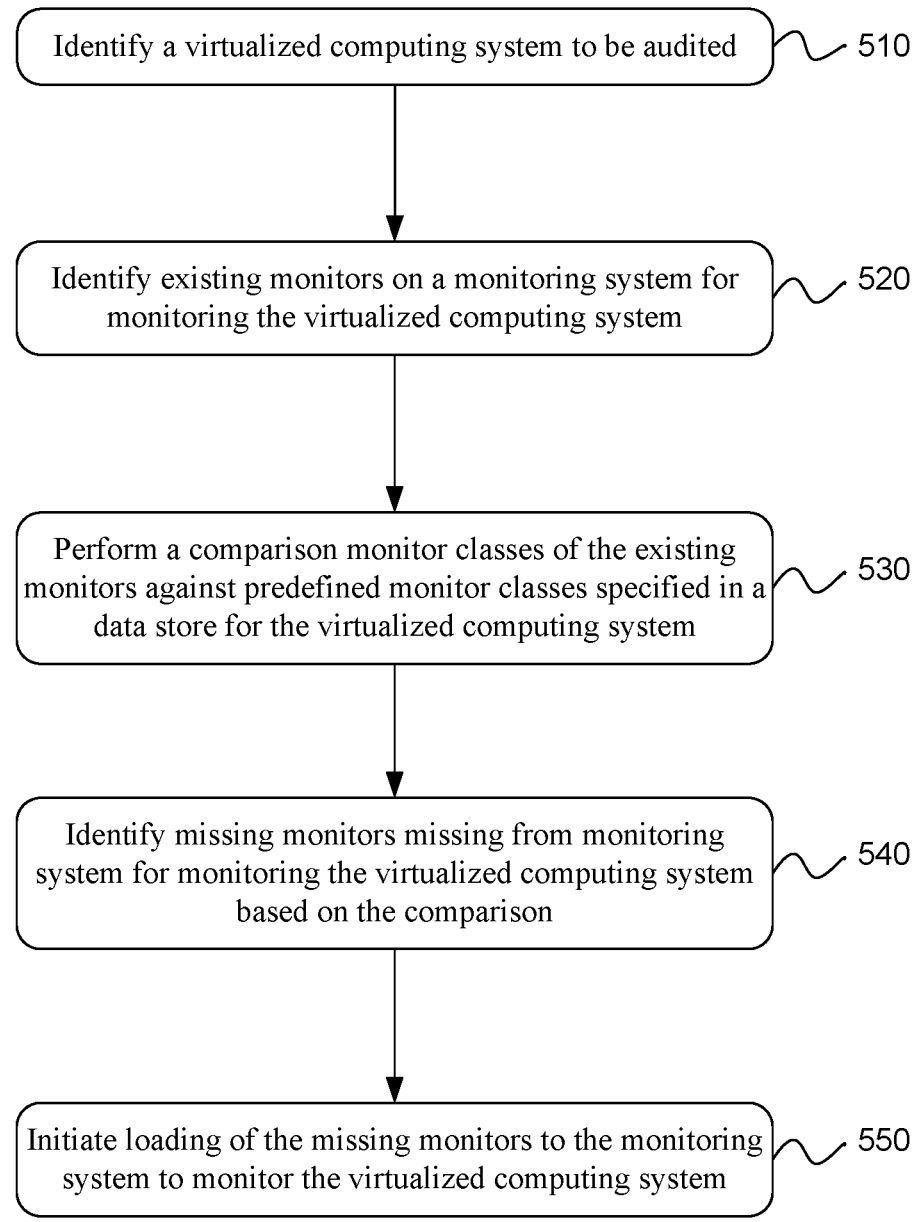
FIGS. 5-6 are flow diagrams for methods of auditing computing system monitors in accordance with examples of the present technology.
Figure 6:
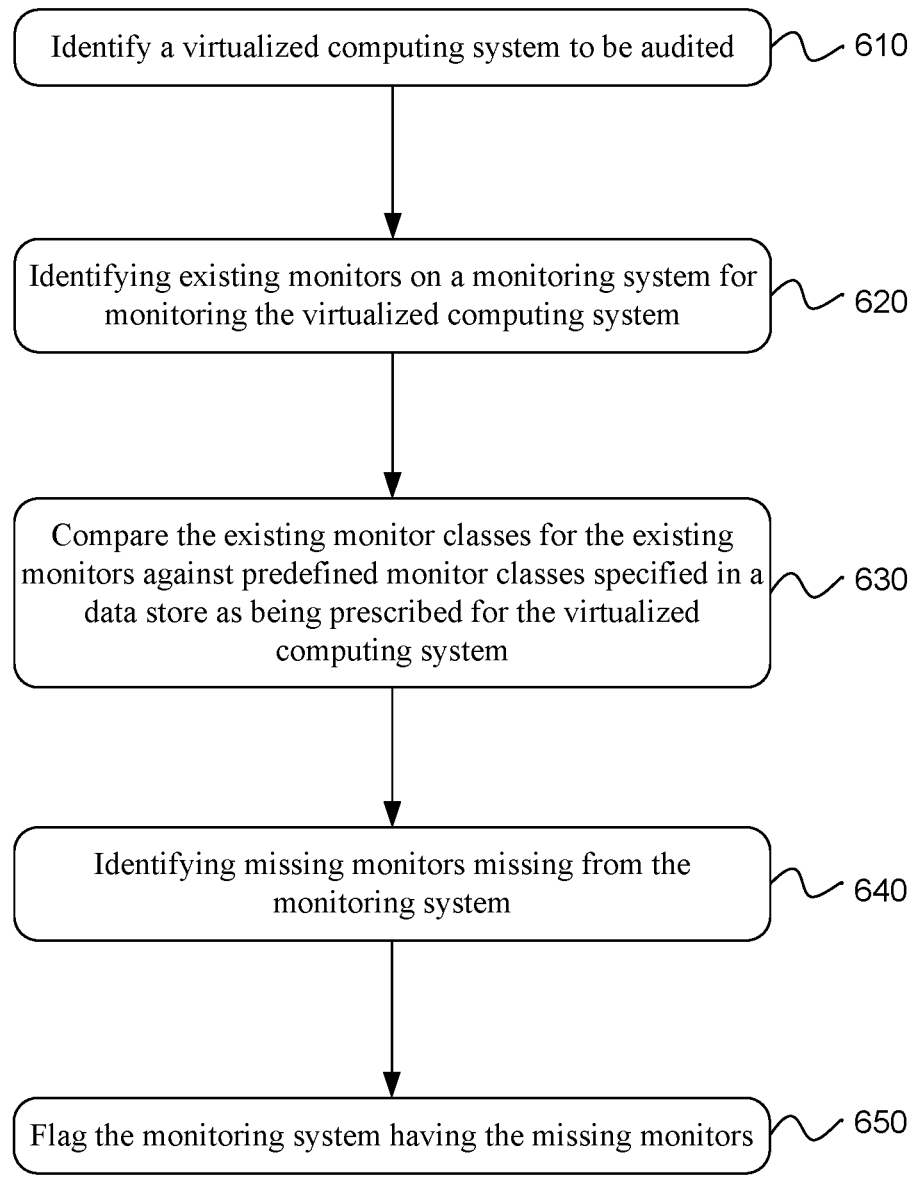

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for auditing computing system monitors. The method may include identifying 510 a virtualized computing system to be audited. The virtualized computing system may reside in a service provider environment. Existing monitors may be identified 520 on a monitoring system for monitoring the virtualized computing system and collecting metrics, logging events and so forth. A list of existing monitor classes may be compared 530 against a list of pre-defined monitor classes as specified in a monitors data store for the virtualized computing system. Missing monitors missing from the virtualized computing system may be identified 540 based on the comparison. The missing monitors may be loaded 550 or installed to the monitoring system to monitor the virtualized computing system.

In one example, the method may include associating system monitor names with classes of monitors in the monitors data store to evaluate the existing monitors by class to identify the missing monitors as compared with pre-defined monitor classes for the virtualized computing system. The classes of monitors may include classes defined by hardware capacity, queue sizes or the like.

The method may further include maintaining a monitors data store. The monitors data store may be configured to store system monitor data for the computing system and for other virtualized computing systems. The monitors data store may further store system monitor classes for the existing, defined or missing monitors and identification of classes of monitors supported by the virtualized computing system. For example, the classes may be identified in metadata for each specifically defined monitor in the monitors data store.

The method may include flagging the monitoring system as missing the missing monitors. The method may also, or alternatively, include notifying an administrator of the missing monitors and/or of any remedial action taken or recommended with respect to the virtualized computing system or monitoring system.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for auditing computing system monitors. The method may include identifying 610 a virtualized computing system to be audited. The method may further include identifying 620 existing monitors on a monitoring system for monitoring the virtualized computing system. Classes of the existing monitors may be compared 630 against defined monitor classes specified in a monitors data store for the virtualized computing system to identify 640 missing monitors missing from the monitoring system. The monitoring system may be flagged 650 as missing the missing monitors when the missing monitors are identified.

The method may include determining whether one of the existing monitors is redundant with another one of the existing monitors. If an existing monitor is redundant, the existing monitor may be removed. The method may include determining whether an existing monitor is inefficient as compared with a more efficient monitor, the existing monitor may be replaced with the more efficient monitor.

The method may include associating system monitor names with classes of monitors in the monitors data store to evaluate the existing monitors by class to identify the missing monitors. The classes of monitors may include classes defined by hardware capacity, queue sizes or the like. System monitor names may also be associated with categories of monitors in the monitors data store to evaluate the existing monitors by category to identify the missing monitors. For example, the categories of monitors may include availability and performance categories.

The method may include identifying applications on the virtualized computing system. The method may also include comparing the existing monitors to monitors in the monitors data store to identify monitors associated with the applications on the virtualized computing system. The method may include auditing third party monitors, virtualized computing systems or monitoring systems.

The method may include auditing a plurality of different computing systems and using a monitoring solution for one system as a base configuration for the other computing system in identifying more or less efficient monitors, generating recommendations, identifying missing monitors and so forth. In a specific example, the method may include comparing the existing monitors against monitors or monitor data collected or aggregated for numerous virtualized computing systems. The missing monitors may be identified based on comparison to the monitor classes for one or more other virtualized computing systems or to average or aggregate data for a plurality of virtualized computing systems. A recommendation may be made to add the missing monitors to the monitoring system.

Various recommendations may be made. For example, the method may include recommending the use of a recommended system monitor for use in the monitoring system as a replacement for one of the existing monitors or in addition to the existing monitors based on the identification of the missing monitors. The method may include recommending removal of existing monitors with usage less than a predetermined threshold over a predetermined period of time. The method may include recommending modification of existing monitors based on historical trends identified from the audit of the virtualized computing or monitoring system over time.

Figure 7:
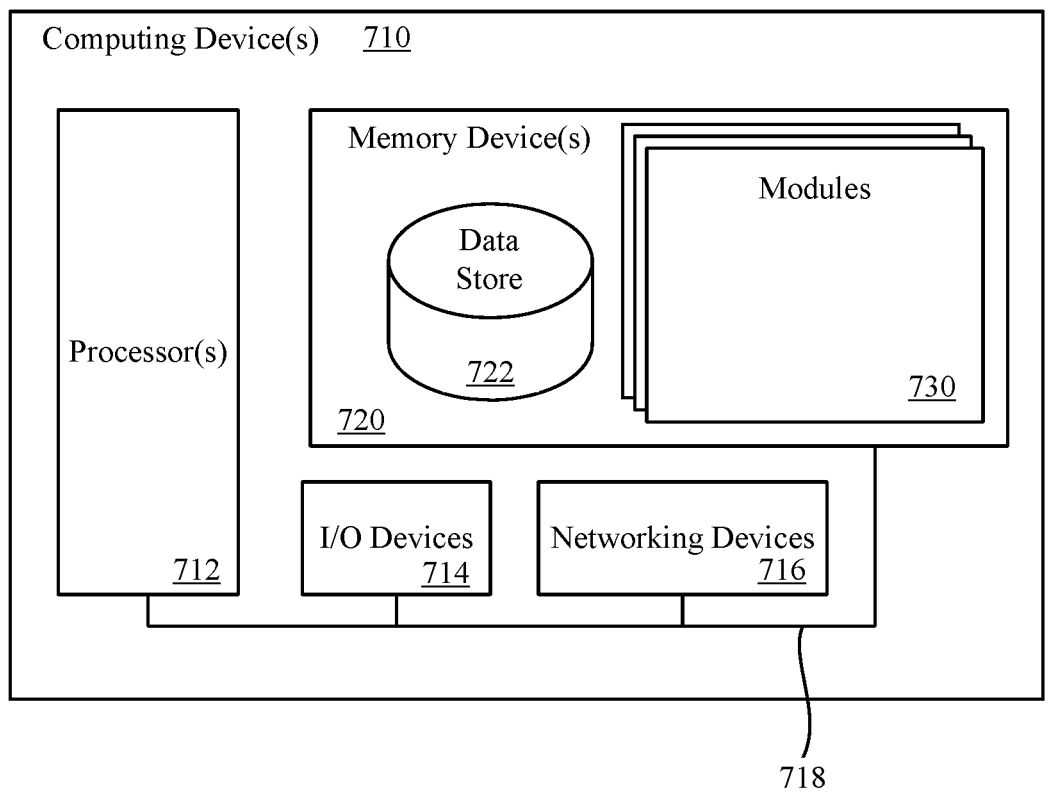
FIG. 7 is a block diagram of a computing system for auditing computing system monitors in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two or more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium comprising computer-executable instructions which, when executed by a processor, implement an audit method, comprising:
   identifying, by monitor class, existing monitors for monitoring a computing system, the existing monitors having monitor names;
   associating the monitor names with monitor classes;
   comparing, based on the monitor names, the monitor classes of the existing monitors against monitor classes of monitors on a list of monitors recommended for the computing system and supported by the computing system; and
   replacing one of the existing monitors with a recommended monitor from the list of monitors recommended for the computing system and having a different class from the one of the existing monitors, wherein the recommended monitor collects metrics collected by the one of the existing monitors and is more efficient than the one of the existing monitors.

2. The computer-readable medium of claim 1, wherein the method further comprises:
   identifying the existing monitors by monitor names associated with the monitor classes;
   comparing the monitor classes of the existing monitors against a monitor class of the recommended monitor; and
   replacing the one of the existing monitors having a first monitor class with the monitor recommend for the computing system having a second monitor class different from the first monitor class.

3. The computer-readable medium of claim 1, wherein a class of the one of the existing monitors is unknown and the method further comprises identifying the class of the one of the existing monitors based on metrics provided using the one of the existing monitors.

4. The computer-readable medium of claim 1, wherein the recommended monitor is of a different type or category from the one of the existing monitors.

5. The computer-readable medium of claim 4, wherein: categories of the existing monitors include availability and performance categories; and types of the existing monitors include event monitors and metrics monitors.

6. A method, comprising:
   identifying, by monitor class, existing monitors for monitoring a computing system, the existing monitors having monitor names;
   associating the monitor names with monitor classes;
   comparing, based on the monitor names, the monitor classes of the existing monitors against monitor classes of a list of recommended monitors for the computing system and supported by the computing system; and
   replacing at least one of the existing monitors having a first monitor class with at least one of the recommended monitors having a second monitor class different from the first monitor class, wherein the at least one of the recommended monitors replacing the at least one of the existing monitors collects metrics collected by the at least one of the existing monitors and is more efficient than the at least one of the existing monitors.

7. The method of claim 6, further comprising:
performing a comparison of the existing monitors against aggregated monitor class data for monitors used in monitoring a plurality of other computing systems; and
determining that the at least one of the recommended monitors having the second monitor class is not monitoring the one or more computing systems as a result of the comparison of the existing monitors monitoring the computing system to the aggregated monitor class data for the plurality of other computing systems.

8. The method of claim 6, further comprising associating identifications of monitors and monitor classes to enable determining whether one or more of the recommended monitors are not monitoring the computing system based on an identification of the existing monitors monitoring the computing system.

9. The method of claim 8, further comprising storing metadata for the monitors, the metadata including the monitor classes supported by the computing system.

10. The method of claim 9, further comprising determining that the second monitor class is supported by the computing system.

11. The method of claim 6, further comprising flagging the computing system where the at least one of the recommended monitors having the second monitor class is not monitoring the computing system in order to notify an administrator.

12. A computer implemented method, comprising:
identifying, by monitor class, existing monitors on a monitoring system for monitoring a virtualized computing system, the existing monitors having monitor names;
associating the monitor names with classes of monitors;
identifying a recommended monitor for replacing one of the existing monitors based on comparing, based on the monitor names, the monitor classes of the existing monitors against monitor classes of monitors on a list of monitors recommended for the virtualized computing system and supported by the virtualized computing system; and
replacing the one of the existing monitors in the monitoring system with the recommended monitor and having a different class from the one of the existing monitors, wherein the recommended monitor collects metrics collected by the one of the existing monitors and is more efficient than the one of the existing monitors.

13. The method of claim 12, wherein the monitor classes include classes defined by hardware capacity, software capacity, queue sizes, latency, thread pool sizes, event detection, log scanning, or storage sizes.

14. The method of claim 12, further comprising associating the monitor names with categories of monitors and evaluating the existing monitors by category to identify the recommended monitor.

15. The method of claim 14, wherein the categories of monitors includes availability and performance categories.

16. The method of claim 12, further comprising:
comparing the classes of monitors of the existing monitors against monitor classes previously collected for a plurality of other virtualized computing systems;
identifying the recommended monitor based on comparing the classes of monitors of the existing monitors to the monitor classes for the plurality of other virtualized computing systems; and
recommending replacement of the one of the existing monitors in the virtualized computing system.

17. The method of claim 12, further comprising recommending use of the recommended monitor in the monitoring system as a replacement for the one of the existing monitors or in addition to the existing monitors.

18. The method of claim 12, further comprising recommending removal of another one of the existing monitors with usage less than a predetermined threshold over a predetermined period of time.

* * * * *